US008186501B2

(12) United States Patent
Wolkerstorfer (10) Patent No.: US 8,186,501 B2
(45) Date of Patent: May 29, 2012

(54) CONVEYING DEVICE FOR PACKAGED ITEMS AND A METHOD FOR OPERATING SUCH A DEVICE

(75) Inventor: Christoph Wolkerstorfer, Wels (AT)

(73) Assignee: TGW Mechanics GmbH, Wels (AT)

( * ) Notice: Subject to any disclaimer, the term of this patent is extended or adjusted under 35 U.S.C. 154(b) by 176 days.

(21) Appl. No.: 12/734,221

(22) PCT Filed: Oct. 20, 2008

(86) PCT No.: PCT/AT2008/000380
§ 371 (c)(1),
(2), (4) Date: Apr. 19, 2010

(87) PCT Pub. No.: WO2009/049346
PCT Pub. Date: Apr. 23, 2009

(65) Prior Publication Data
US 2010/0294625 A1    Nov. 25, 2010

(30) Foreign Application Priority Data
Oct. 19, 2007    (AT) ................................ A 1687/2007

(51) Int. Cl.
*B65G 13/06* (2006.01)
(52) U.S. Cl. ............... 198/781.03; 198/781.09; 198/789
(58) Field of Classification Search ............. 198/780, 198/781.03, 781.09, 781.1, 789, 790
See application file for complete search history.

(56) References Cited

U.S. PATENT DOCUMENTS

| | | | |
|---|---|---|---|
| 4,108,304 A * | 8/1978 | McKnight et al. ....... | 198/781.09 |
| 4,133,425 A * | 1/1979 | Roach ..................... | 198/781.03 |
| 4,832,184 A * | 5/1989 | DeGood ................. | 198/781.03 |
| 5,115,908 A | 5/1992 | Williams | |
| 5,850,906 A | 12/1998 | Dean | |
| 6,672,449 B2 * | 1/2004 | Nakamura et al. ............ | 198/788 |
| 6,772,874 B2 * | 8/2004 | Yamashita et al. ....... | 198/781.03 |
| 6,854,592 B2 * | 2/2005 | Fukuoka ....................... | 198/788 |
| 7,841,461 B2 * | 11/2010 | Nguyen et al. ........... | 198/781.03 |
| 2006/0266625 A1 | 11/2006 | German et al. | |

FOREIGN PATENT DOCUMENTS

| | | |
|---|---|---|
| DE | 25 33 893 | 2/1976 |
| DE | 43 33 625 | 4/1995 |
| DE | 196 33 371 | 2/1998 |
| DE | 101 08 533 | 9/2002 |
| DE | 20 2004 007 435 | 7/2004 |
| EP | 0 446 992 | 9/1991 |
| EP | 1 314 663 | 5/2003 |
| WO | WO 99/22156 | 5/1999 |

OTHER PUBLICATIONS

International Search Report.

* cited by examiner

*Primary Examiner* — James R Bidwell
(74) *Attorney, Agent, or Firm* — Collard & Roe, P.C.

(57) ABSTRACT

A conveying device for packaged items, e.g. goods carriers, containers, storage boxes, packages etc., includes at least one conveying mechanism, e.g. a conveying roller, a conveyor belt, or a conveying chain. A method operates the conveying device with a drive device and with at least one operable coupling between a drive mechanism of the drive device and the conveying mechanism. The coupling includes a gap chamber designed for holding a transmission mechanism between a first and a second coupling element. Adjacent to the gap chamber a regulating element is arranged which creates a power coupling between the coupling elements and is controlled by a control or regulating device.

31 Claims, 5 Drawing Sheets

CONVEYING DEVICE FOR PACKAGED ITEMS AND A METHOD FOR OPERATING SUCH A DEVICE

CROSS REFERENCE TO RELATED APPLICATIONS

This application is the National Stage of PCT/AT2008/000380 filed on Oct. 20, 2008, which claims priority under 35 U.S.C. §119 of Austrian Application No. A 1687/2007 filed on Oct. 19, 2007. The international application under PCT article 21(2) was not published in English.

The invention relates to a conveying device, and a conveying means, as well as a method for operating a conveying device.

From document EP 0 446 992 A1 a conveying device is known for packaged items with at least one conveying means for packaged items that are to be transported thereby and with a drive device and with at least one operable coupling between a drive means of the drive device and the conveying means. The coupling comprises a gap chamber designed for holding a transmission means between a first and a second coupling element, and adjacent to the gap chamber a regulating element creating a power coupling between the coupling elements and driven by a control or regulating device is arranged. The power coupling between the drive means and the conveying means is formed by an elastically deformable annular diaphragm element arranged in a non-rotatable manner on the drive means and chargeable with compressed air in an inner chamber, whereby the compressed air is guided via an axle fixed into a support frame by the drive means arranged rotatably on the axle.

From document EP 1 314 663 A1 an accumulation-pressure-free accumulating roller track is known for conveying objects on roller tracks, which prevents the objects from knocking against one another. For this the roller track is divided into individual sections, which are driven and braked independently of one another. For this a coupling braking unit is used, which is driven in continual rotation via a continuous pulling means and is secured in a non-rotatable manner to a coupling disc. In axial direction on the other side a brake disc is connected securely to the support frame. In a gap chamber between the coupling disc and the brake disc is a transmission disc which is arranged in a non-rotatable manner on a rotatable shaft. By means of axially adjustable intermediate discs provided with a coupling lining and a brake lining the drive or braking torque is transmitted to the shaft and thereby to the drive roller. The adjustment of the respective intermediate disc is performed by means of a coupling magnet and a brake magnet which are controlled as necessary for the respective function.

From document WO 99/22156 A1 a braking device is known with a brake disc arranged securely on the housing and a rotating drive disc surrounding the brake disc radially in the form of a pot. The fixed brake disc is designed as an annular stator with a winding controlled via a line with electrical energy for generating a magnetic field. In an annular gap chamber between the brake disc and an inner surface of the pot-shaped drive disc a powdery medium consisting of metal particles is provided as the transmission means. By means of the corresponding control of the winding the state of the medium in the gap chamber is changed in case of braking action from a liquid state to a semisolid state owing to the build up of the magnetic field and thus a braking effect is achieved on the drive disc.

From document DE 43 33 625 A1 a roller conveyor belt is known with rollers arranged rotatably via a fixed axle, wherein in opposite roller floors on the one hand a drive coupling chargeable with compressed air is arranged between a drive means mounted rotatably on the axle and the roller and in the other roller floor a brake coupling chargeable with compressed air is arranged between the roller floor and a brake disc adjustable in axial direction.

From document DE 25 33 893 A1 a speed-controllable coupling for a rotation machine is known, in which a stator comprising a winding is secured onto a fixed part of a rotation machine. On the drive-side a rotor is provided, which is mounted rotatably in the stator. Furthermore, on the drive side an anchor is arranged which is separated from the drive-side rotor by an intermediate chamber, in which a magnetic fluid is provided under sealing. By feeding an electrical voltage to the winding the magnetic fluid is changed in its physical properties by a control and thus the speed can be controlled.

From DE 20 2004 007 435 U1 a conveying device is known with an accumulating roller conveyor, having a conveying length with transport rollers aligned in parallel spaced apart from one another. The roller track is divided into a plurality of segments, which each have a number of conveying rollers. For each segment a so-called coupling roller is provided which is drive-connected to a common drive and which is also drive-connected with the further rollers of the respective segment. The coupling roller is provided with an electrical coupling, by means of which the coupling and uncoupling from the common drive line can be controlled, and in this way the conveying length can be switched on or off in segments. The electrical coupling is arranged and set up to be integrated into the coupling roller, in order to transmit via frictional engagement the drive power from a drive element, e.g. chain wheel onto a coupling element of the roller and after removing the frictional engagement to interrupt the latter and thus the transport in the respective segment.

From US 2006/0266625 A1 a further accumulating conveying device is known, consisting of a number of belt conveyers arranged in a row in a conveying device. Each belt conveyer is provided with a separate drive and can be switched on and off via a control and regulating device and an electrical coupling arranged in the drive line, either the drive motor or a drive element for the belt.

The objective of the invention is to create a conveying device by means of which a rapid adjustment of the operating mode of several conveying means operated by a common drive device is made possible.

Said objective is achieved by a conveying device having the features in accordance with the invention. The surprising advantage in this case is that in this way a compact structure of the conveying device is obtained with a minimum number of drive components.

Also embodiments are possible, where an alternating drive or brake mode is achieved by means of independently drivable components.

Also embodiments are possible, by means of which a design relative to the application is achieved for the conveying mode and/or braking mode.

By means of advantageous embodiments mechanical components subject to wear are avoided, by means of which on the one hand low-maintenance operation is ensured and on the other hand sensitive control of the torques to be transmitted is achieved. This also leads to a reduction of environmental stresses such a noise pollution, dust pollution etc. as well as very high processing safety, and thus avoids breakdown during the throughput of goods in a goods turnaround system.

However, embodiments are also advantageous, by means of which a high degree of flexibility is achieved regarding the layout of conveying devices to adapt to the various different requirements made of transport systems in order to optimize the flow of goods.

Further advantageous designs ensure a design of the conveying device which is encapsulated against external influences and is thus less prone to failure.

By means of further advantageous designs variants of the conveying device are achieved very easily, by means of which the special properties of the goods to be conveyed can be coordinated and the flow of goods can be optimized, thereby achieving a high degree of energy efficiency.

However, an embodiment is also advantageous, by means of which a conveying device is provided, which allows a modular structure of a plurality of conveying sections with a common drive device designed for continuous operation with an average power requirement, by means of which excessive energy peaks are largely avoided in the supply network.

Also an embodiment is possible in which a high degree of flexibility is achieved regarding the technical design of such conveying devices.

Advantageous embodiments are also described, by means of which a very compact design is achieved, which is suitable for the inexpensive mass production of a coupling and or brake roller and by means of which a virtually emission-free operation is achieved even with high numbers of operations.

The invention also relates to a conveying means for a conveying device. The surprising advantage in this case is the resulting flexibility in the design of conveying systems for multi-layered transport processes for optimizing the throughput time of goods during goods storage and goods distribution. In this way a modular design and inexpensive mass production are achieved as well as a simplification of the replacement of components in case of maintenance work as well as a reduction in the cost of keeping spare parts.

Also further embodiments are advantageous, whereby the use of standard components is possible.

For a better understanding of the invention the latter is explained in more detail with reference to the exemplary embodiments shown in the Figures.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position. Furthermore, also individual features or combinations of features from the various exemplary embodiments shown and described can represent in themselves independent or inventive solutions.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

Figure 1:
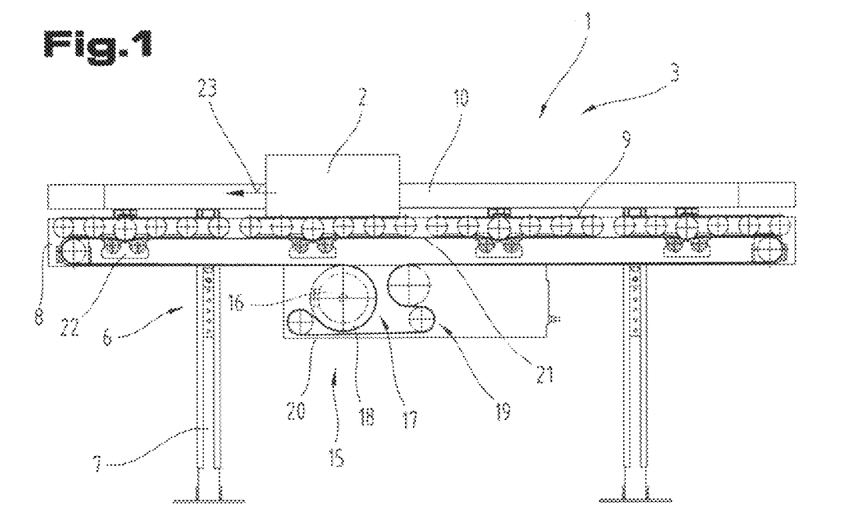
FIG. 1 shows a conveying device according to the invention in elevation.
Figure 2:
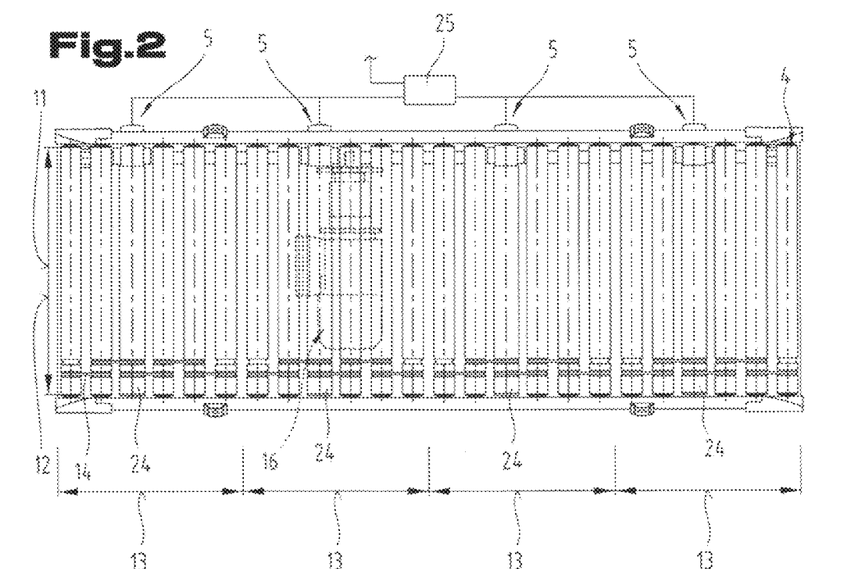
FIG. 2 shows the conveying device in plan view.

FIGS. 1 and 2 show a conveying device 1 for transporting packaged items 2, e.g. goods carriers, containers, storage boxes, packages etc., designed as a roller conveyor 3, wherein conveying means 4 are formed by a number of conveying rollers 5 spaced apart from one another and aligned in parallel to one another.

The conveying device 1 comprises, according to the shown exemplary embodiment, on a support frame 6 consisting of support legs 7 and at least two parallel support profiles 8 arranged in parallel to one another and parallel to a contact surface, the conveying means 4, which in the shown embodiment mount the conveying rollers 5. On the support profiles 8 guiding profiles 10 are arranged which project over a transport plane 9 for the packaged item 2 formed by the upper side of the conveying rollers 5 in longitudinal direction of the conveying device, by means of which a conveying width 11 corresponding to a roller length 12 is delimited.

The conveying rollers 5 are grouped in the conveying device 1 shown by way of example into four conveying sections 13 and for each conveying section 13 in a known manner adjacent conveying rollers 5 are drive-connected to a continuously running drive line 14, e.g. cord belt, band belt, chain etc.

The conveying device 1 with the four conveying sections 13 is driven by means of a common drive device 15, e.g. drive motor 16, via e.g. a flat belt disc 17 and a continuous running drive belt 20 guided via a clamping device 19 and on the undersides of the conveying rollers 5. Of course, the use of a chain drive would also be possible.

For each conveying section 13 the drive line 20, in particular a flat belt 21 is pressed against one of the conveying rollers 5 of the conveying section 13 to increase the frictional engagement between the flat belt and the conveying roller 5 by means of roller apparatus 22 to form a contact angle with the lower side of the conveying roller 5, by means of which the necessary drive power for conveying the packaged item 2 is reliably transmitted in conveying direction—according to arrow 23—by flat belt 21 to one of the conveying rollers 5 of each conveying sections 13 by means of friction.

The conveying roller 5 charged by the drive belt 20 and by means of the roller apparatus 22 by drive force is designed as a coupling and/or brake roller 24, whereby by means of a control and regulating device 25 the individual conveying sections 13 can be operated as necessary in a go/stop mode, and thereby the conveying device 1 is designed as a so-called continuous or banking-up conveyor.

By means of not shown detecting means known from the prior art, e.g. proximity sensors, light barriers, scanners etc., at each section 13 and at the control and regulating device 25 a drive selection of the individual sections is possible, and in this way the full utilisation of the conveying device 1 is achieved, even with changing incoming and outgoing conveying conditions of the flow of goods.

Figure 3:
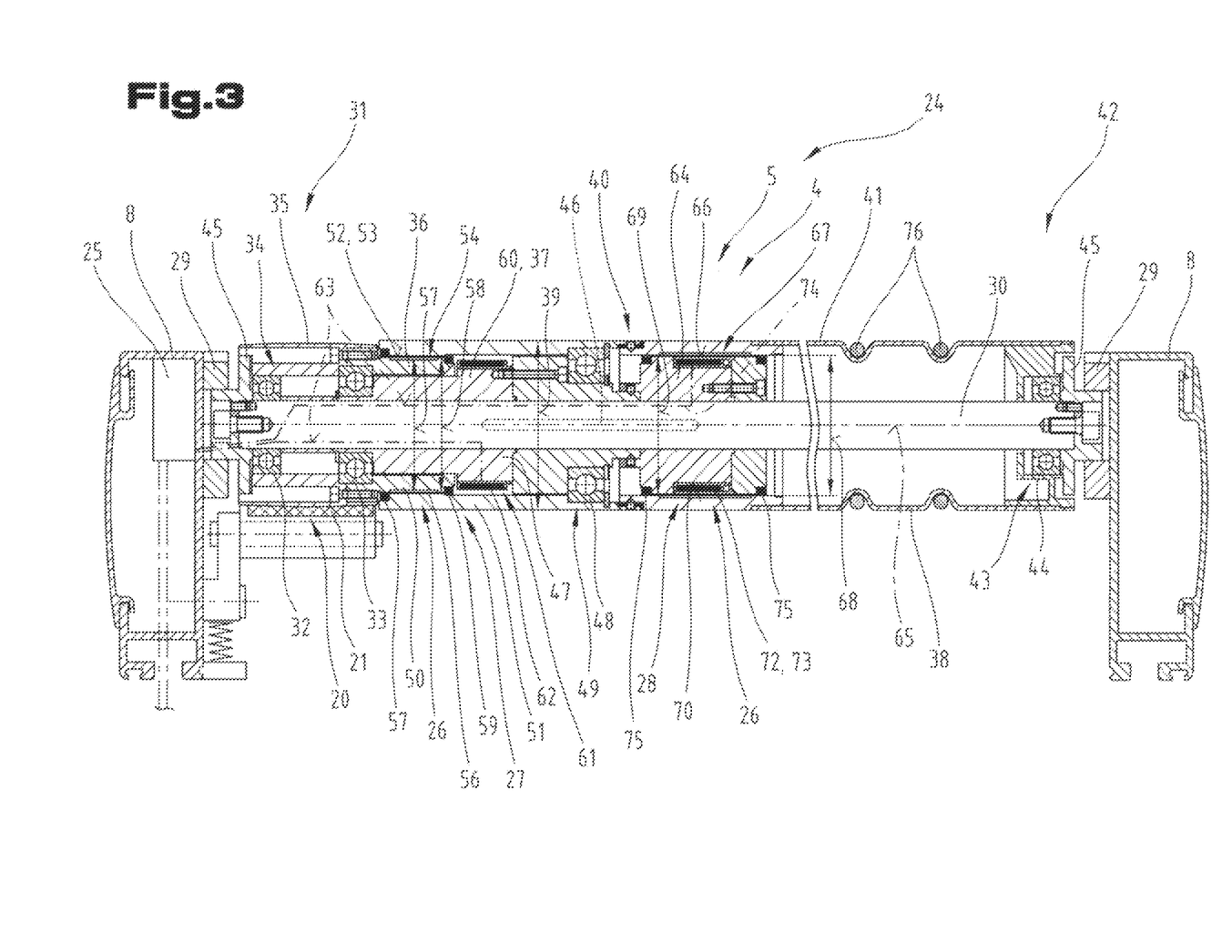
FIG. 3 shows a conveying means according to the invention in cross section.

FIG. 3 shows a possible design of the conveying roller 5 with integrated couplings 26 designed as a coupling and/or brake roller 24, one coupling of which is designed as a drive coupling 27 and the other as a brake coupling 28.

The structure of the coupling and/or brake roller 24 according to the shown exemplary embodiment comprises an axle 30 which is held in a non-rotatable manner in mounts 29 on the support profiles 8 and traverses the conveying roller 5 over the entire length. Of course, a design is also possible in which the conveying rollers are held by axial stumps provided on both sides on the support profiles 8.

At an end section 31 of the conveying roller 5 by means of a bearing arrangement 34 formed preferably by two spaced apart ball or roller bearings 32, 33 a drive means 35, e.g. roller, pulley, sprocket wheel etc., is mounted rotatably on the axle 30 or stub shaft. The drive means 35 comprises a tubular extension 36, which projects into a tube 38 forming a roller element 37 of the conveying roller 5. In the shown exemplary, embodiment the drive means 35 and the tube extension 36 are designed in two parts for assembly and manufacturing reasons. Of course, a one-piece design is also possible.

The tube 38 has an external diameter 39 corresponding to that of the conveyor rollers 5 and is divided for assembly purposes into two longitudinal sections, whereby the sections are joined in an overlapping area 40 while still maintaining the external diameter 39.

By means of the roller element 37 also a relatively thin-walled tube 41 is arranged extending up to a further end section 42 of the conveying roller 5 and in this end section 42 the conveying roller 5 is mounted with the two-part roller element 37 and the tube 41 by a further bearing arrangement 43, in particular a deep-groove ball bearing 44 on the axle 30 or a stub shaft. The bearing arrangements 34, 43 are enclosed in a dustproof manner in the end sections 31, 42 by means of cover discs 45.

The roller element 37 with the tube 41 connected therewith is mounted relative to the axle 30 or by a bearing support ring 47 connected by an insertion wedge 46 or adhesion etc. in a non-rotatable manner to the axle 30 and a bearing arrangement 49 preferably in the form of a deep-groove ball bearing 48 to be exactly coaxial to the tubular extension 36 of the drive element 35.

The shown bearing of the drive means 35 with the extension 36 and the roller element 37 with the tube 41 on the axle 30 ensures an independent relative rotary movement.

The drive coupling 27 is formed by the tube extension 36 of the drive means 35, which projects into the roller element 37 and forms a first coupling element 50, and the roller element 37 which forms a further coupling element 51.

Between an outer surface 52 of the extension 36 projecting into the roller element 37 and an inner surface 53 of the roller element 37 a gap chamber 54 is provided for holding a transmission means 56, e.g. a medium which can be changed in at least one physical parameter or mechanical parameter.

It is known for example from the prior art to have a liquid or paste-like, but also powdery or granulate media as the transmission means 56 with a high electrorheological or magnetorheological effect. The latter have a low base viscosity or shearing strength, and can be changed in their viscosity or strength values by the action of an electrical voltage field or a magnetic field in a large control range in fractions of a second, and are therefore suitable for a controlled power coupling between the coupling elements 50, 51. Furthermore, such media are not subjected to any abrasion and material composites are known, which have low conductivity and good lubricating properties, whereby an interference-free, low-maintenance long term operation is achieved with low environmental stress.

The gap form is not restricted to any specific dimensional shape and can be adjusted to the corresponding properties of the provided medium, e.g. viscosity, particle size etc.

According to the exemplary embodiment shown the gap chamber 54 is formed in that the external diameter 57 of the tube extension 36 is smaller than the internal diameter 58 of the roller element 37. However, it is also possible to provide recesses in the internal diameter 58 and/or external diameter 57, e.g. circumferential grooves, partial depressions etc.

The gap chamber 54 is sealed, particularly if a fluid transmission means 56 is provided in the latter, by two sealing rings 59 spaced apart from one another in the direction of the roller length.

Adjacent to the gap chamber 54 on a support sleeve 60 connected in a non-rotatable manner to the axle 30 or the bearing support ring 47, inside the roller element 37, a regulating element 61 is arranged, by means of which the parameter to be changed physically can be influenced, e.g. an electric coil 62, which is connected via a line 63 running preferably in the axle 30 to the control and regulating device 25 and a power source.

The regulating element 61 is provided for creating an electrical voltage field, magnetic field etc. and is fixed in the immediate vicinity, in particular within an effective range of the generated field to the gap chamber 54 on the support sleeve 60.

On charging the regulating element 61 with electrical power a variable power coupling is provided between the coupling elements 50, 51 of the drive coupling 27, the size of which can be controlled by the control and regulating device 25.

According to a preferred development the drive coupling 27 is arranged in the direction of the end section 42 with the bearing arrangement 43 spaced apart from the brake coupling 28 in the roller element 37.

The latter comprises an annular brake element 64 connected in a non-rotatable manner with the axle 30 or a stub shaft, which preferably is designed to be divided in a plane aligned perpendicular to a longitudinal middle axle 65 of the axle 30. Between an outer circumferential surface 66 of the braking element 64 and the inner surface 53 of the roller element 37 a further gap chamber 67 is formed, in that an internal diameter 68 of the roller element 37 is greater than the external diameter 69 of the braking element 64.

In the shown exemplary embodiment a surrounding groove-like depression 70 is provided, which is made in an external circumference 71 of the braking element 64, in which a further regulating element 73 is arranged, e.g. an electric coil 72. The latter is line-connected for power charging via an additional line 74 arranged preferably in the axle 30 with the control and regulating device 25, which is arranged for example in the support profile 8.

The configuration of the gap chamber 67 of the brake coupling 28 is designed to be the same as the drive coupling 27 and in the case of a fluid transmission means provided therein is sealed on end face sections of the braking element 64 from the inner surface 53 of the roller element 37 by means of sealing rings 75.

For the functioning of the described coupling and/or brake roller 24, which, as already described with reference to the preceding figures, is drive-connected to at least one additional conveying means 4, e.g. conveying roller 5, to form the conveying section 13, e.g. in the end section 42 of the coupling and/or brake roller 24 by means of cord belts 76 or other transmitting means, e.g. flat belt, chain, the following is carried out.

The rotational movement of the coupling and/or brake roller 24 is performed by means of the drive device shown in the preceding figures by means of the drive line designed for example as a flat belt via the frictional engagement of the flat belt 21 with the lower side of the drive means 35 in the form of a roller and force closure in the drive coupling 27.

In the described exemplary embodiment in order to achieve said force closure the transmission means 56 arranged in the gap chamber 54 is used, which produces a variable power coupling by changing at least one physical parameter between the coupling elements 50, 51.

The coupling and/or brake roller 24 is therefore, as long as the force closure is maintained in the drive coupling 27, in rotational movement along with further conveying rollers 5 of the conveying section 13.

If the transport flow of a packaged item 2 in one of the conveying sections 13 has to be stopped, this is carried out by returning the changed physical parameter of the transmission means 56 to its initial state by a corresponding control of the regulating element 61 of the drive coupling 27, whereby the power coupling between the coupling elements 50, 51 is interrupted.

In the described design of the coupling and/or brake roller 24 with the additional coupling 26 designed as a brake coupling 28 it is possible, at the same time as interrupting the power coupling in the drive coupling 27, by controlling the regulating element 67 of the brake coupling 28 and by changing a physical parameter of the transmission means 56 provided in the gap chamber 67, to produce a power coupling between the brake element 64 connected in a non-rotatable manner to the axle 30 and the roller element 37, resulting in a virtually non-lagging stopping of the coupling and/or brake roller and in this way the conveying section is brought to a stop.

The packaged item thus stops immediately and by means of the independent drive of the coupling and/or brake rollers 24 of each conveying section the thus designed conveying device 1 is suitable for a phased operating mode for transporting the packaged item and thus in particular as a banking-up conveyor.

It should also be noted that as already determined by the definition, coupling and/or brake roller 24, it is of course possible to provide in the conveying roller 5 in a modification of the described embodiment only one drive coupling 27 or only one brake coupling 28.

However, this also opens up a whole series of other application areas for the conveying device 1, such as for example instead of the previously described horizontal conveyor or banking-up conveyor sections also ascending and/or descending conveying sections are possible. By means of a suitable application in such conveying sections of the coupling and/or brake rollers 24, as a result of the high control range of the transmission means 54 controlled sensitively for the drive coupling 27 and/or brake coupling 28, the driving or braking of such conveying sections can be influenced by predefined properties of the packaged item 2, e.g. dimensions, weight etc, by adapted control measures of the control and regulating device 25. In this case, conveying sections not divided into sections can be operated by means of the conveying device 1 with coupling and/or brake rollers 24 or conveying rollers 5 that are drive-connected at predefined distances to the drive device 15, which are only provided with the drive coupling 27 or only with the brake coupling 28 or also with the drive coupling 27 and the brake coupling 28.

Figure 4:
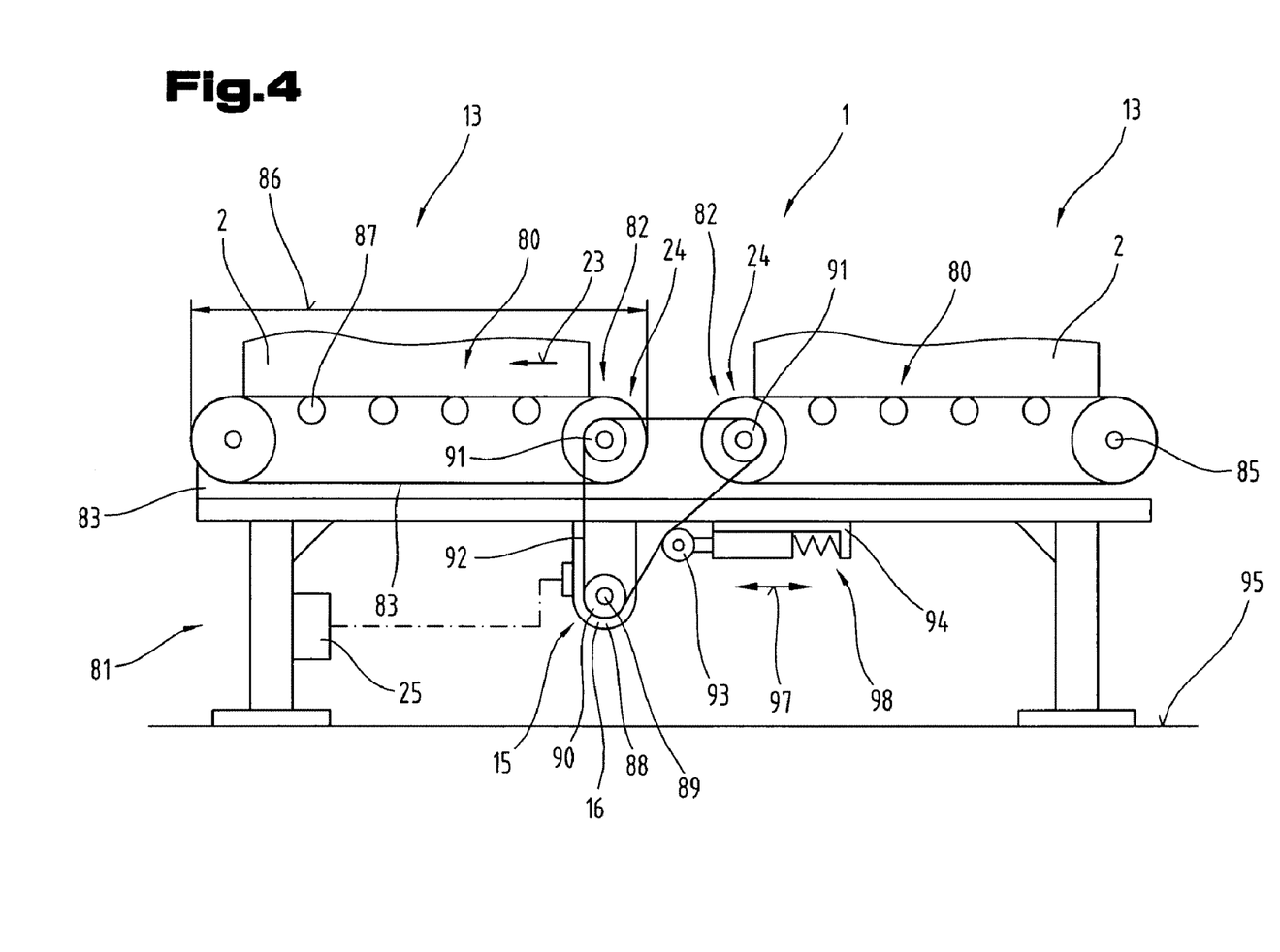
FIG. 4 shows a further embodiment of the conveying device according to the invention in elevation.

FIG. 4 shows a further possible embodiment of the conveying device 1 for packaged items 2, in which for example two conveying sections 13 are shown by two band or belt conveyors 80 which are operated by a common drive device 15.

On a common lower frame 81 in conveying direction—according to arrow 23—, immediately adjoining one another the band or belt conveyors 80 are arranged, each of which comprises a belt 83 guided continuously around two guiding rollers 82, and the guiding rollers 82 are arranged rotatably about stub shafts 85 fixed in the lower frame 81 or longitudinal profiles 84. At a distance 86, which in principle determines the conveying length of the belt or belt conveyor 80, for example a number of support rollers 87 are mounted rotatably for supporting the belt 83 on the longitudinal profiles 84. The drive device 15 forms a drive motor 87 on the lower frame 81, secured preferably by suspension, e.g. drive motor 16, which is positioned approximately between the immediately opposite guiding rollers 82. On a drive shaft 89 of the drive motor 88 for example a sprocket wheel 90 is arranged in a non-rotatable manner. Furthermore, the facing guiding rollers 82 comprise the drive means 35 designed as a sprocket wheels 91 and a rotating chain strand 92 is the drive-connection between the sprocket wheel 90 of the drive motor 16 and the sprocket wheels 91 of the guiding rollers 82. Preferably, a tensioning wheel 93 controlling the tension of the chain strand 92 acts on a connecting strand between the sprocket wheel 90 of the drive motor 16 and one of the sprocket wheels 91 of the guiding rollers 82, which tensioning wheel 93 is guided adjustably for example along a linear guide 94 on a lower side 95 of the longitudinal profiles 82 in a direction parallel to the contact surface 96—according to double arrow 97, and is pressed under pretensioning by a spring arrangement against the chain strand 92, whereby the latter remains continually tensioned even after the lengthening of the chain caused by use.

The guiding rollers 82 provided by the drive means 35 are preferably, according to the design described with reference to FIG. 3, provided with the drive coupling and if necessary also the brake coupling, whereby the latter operate as the previously described coupling and/or brake roller 24 and are arranged for a go/stop operating mode of the band or belt conveyor 80 controllable by the control and regulating device 25. In this way the conveying device 1 with the two conveying sections 13 can be used both as a continuous conveyor and also as a banking-up conveyor.

Of course, it should also be noted that the shown conveying device 1 with the two conveying sections 13 formed by two band or belt conveyors 80 can be extended by further such and in particular modular band or belt conveyors 80, with a corresponding design of the drive device 15, and can be operated by a joint drive motor 16 in an arrangement of the guiding rollers 82 as coupling and/or brake rollers 24.

Figure 5:
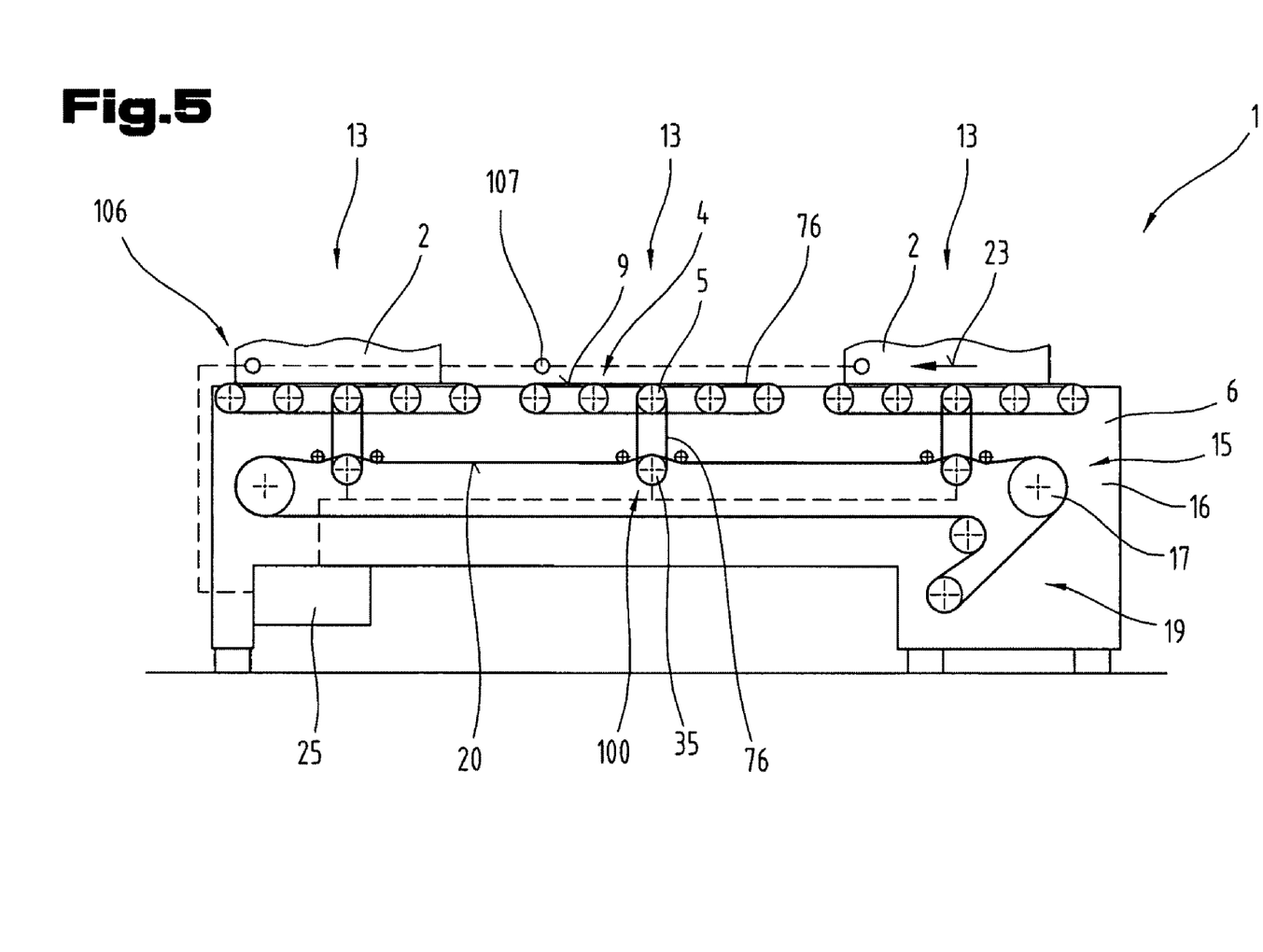
FIG. 5 shows a further design of the transport device according to the invention in a simplified view.

FIG. 5 shows a further exemplary embodiment of the conveying device 1 for transporting packaged items 2 with three of the conveying sections 13 by way of example, which are driven by a joint drive device 15, e.g. the drive motor 16.

In the support frame 6 for example there are five conveying means 4 forming a transport section 13, in particular in the shown example the driven conveying rollers 5 are arranged rotatably spaced apart and parallel to one another in conveying direction—according to arrow 23. The conveying means 4 of a conveying section 13 are drive-connected to one another in a known manner.

In the support frame 6 underneath the conveying rollers 5 the drive device 15 is arranged with the continuously running drive belt 20 with at least one drive strand running parallel to the transport plane 9 and extending over virtually the entire length of the conveying device 1.

By way of example it is shown how the drive belt 20 is guided via a flat belt disc 17 of the drive motor 16 and an adjoining clamping device 19 and an additional guiding disc.

At this point it is noted in addition that the shown drive device 15 can of course also be in the form of a chain drive with a rotating drive chain or cable drive etc.

For each conveying section 13 one of the conveying means 4 can be operated via a drive and/or brake unit 100 with the drive device 15 arranged in the support frame 6, in particular via the frictional engagement of the drive means 35 with the flat belt 20, in an operating mode or braking mode, according to the control and regulating requirements of the control and regulating device 25.

The drive and/or brake units 100 of each conveying section 13 are preferably connected by line to the control and regulating device 25.

This makes is possible via the joint drive device 15 to operate the conveying sections 13 individually according to the control requirements for a continuous or phased conveyance of the packaged item 2.

Figure 6:
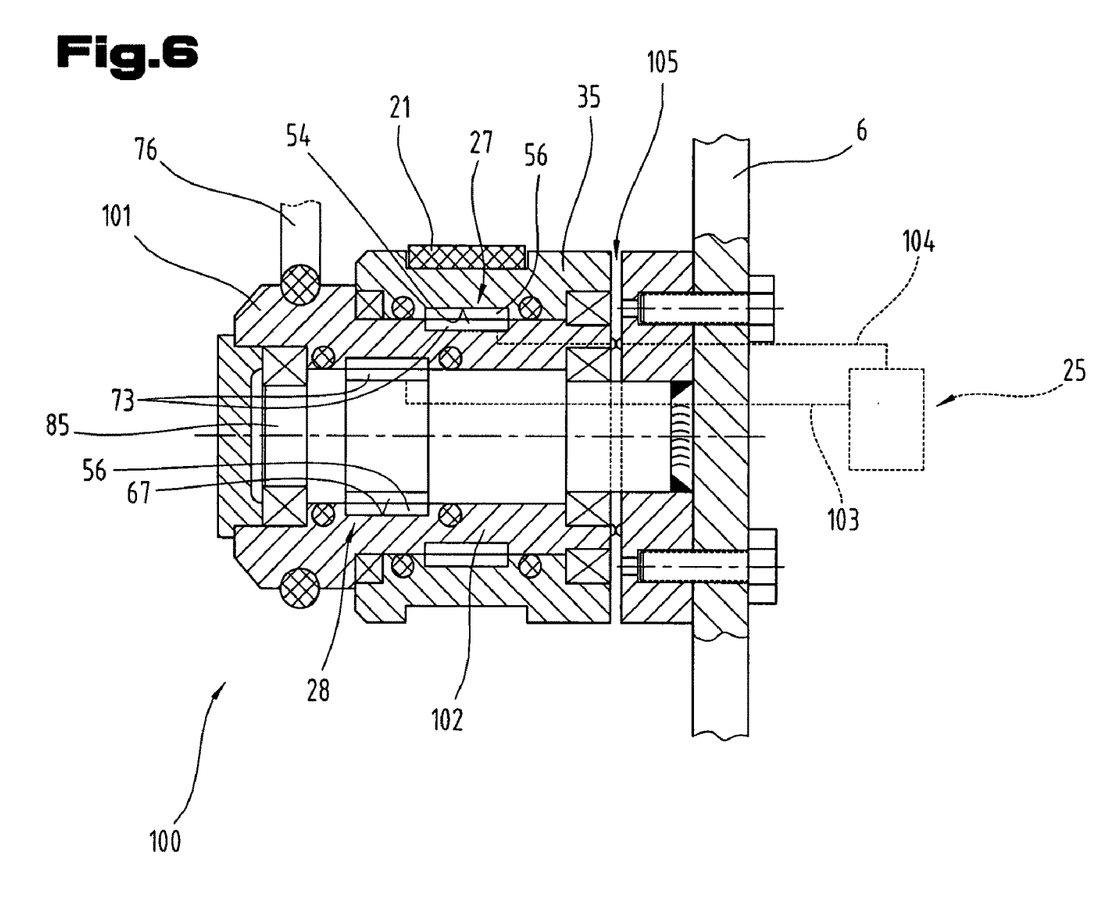
FIG. 6 shows a design according to the invention of a drive and/or brake unit of the conveying device according to the invention.

FIG. 6 shows in detail a possible embodiment of the drive and/or brake unit 100 equipped with the drive coupling 27 and the brake coupling 28.

On the stub shaft 85 arranged securely on the frame a drive disc 101 is arranged rotatably, which is in drive-connection for example with the cord belt 76 with one of the conveying rollers 5.

On a hub 102 of the drive disc 101 the drive means 35 is mounted rotatably by frictional engagement with the flat belt 21. Between the hub 102 of the drive disc 101 and the fixed stub shaft 85 the gap chamber 67 is arranged with the transmission means 56 of the brake coupling 28.

Between the hub 102 and the drive means 35 mounted rotatably on the latter the gap chamber 54 of the drive coupling 27 provided with the transmission means 56 is formed. Immediately adjacent to the gap chamber 54, 67 the regulating elements 73 are arranged, which are connected to the control and regulating device 25 for example by means of a line 103 running in the stub shaft 85, a line 104 and a rotary transmitter 105.

By controlling the regulating elements 73 by means of the control and regulating device 25 now optionally the drive and/or braking function can be controlled by influencing at least one physical parameter of the transmission means 56, as already explained in particular in the description of FIG. 3.

By way of example a possible conveying situation is shown in FIG. 5, in which in an end section 106 of the conveying device 1 the packaged item 2 is prevented from further movement by a not shown conveyor in waiting position, by activating the braking function.

The conveying section 13 arranged in front of said conveying section 13 in transport direction—according to arrow 23—is free in the shown exemplary embodiment, whereas in the conveying section 13 arranged further forward a packaged item 2 is present, e.g. by means of a not shown conveyor.

To achieve a close banking-up accumulation only those conveying sections 13 arranged in front of the occupied conveying section 13 are activated in drive mode by means of the drive coupling 27, until sensors 107, which are assigned to the conveying sections 13 and in communication-connection with the control and regulating device 25, detect the given banking-up status and the corresponding conveying sections 13 are stopped by deactivating the drive coupling 27 and activating the brake coupling 28.

In a modification of the drive and/or brake unit 100 described above it is of course possible to design the latter to comprise only the drive coupling 27, particularly if for example one conveying segment has an external braking device on conveying rollers.

However, it is also conceivable to provide only the brake coupling 28, for example, if one drive segment is stopped by stopping the drive motor and a secure stoppage of the transported goods is required.

Regardless of the required operating modes of the conveying sections 13 in this way an uninterrupted continuous operation of the drive device 15 or the drive motor 16 is possible, whereby permanent switching and control functions of the drive motor 16 are avoided.

The exemplary embodiments show possible embodiment variants of the conveying device, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field. Thus all conceivable embodiment variants, which are made possible by combining individual details of the embodiment variants shown and described, are also covered by the scope of protection.

Finally, as a point of formality, it should be noted that for a better understanding of the structure of the conveying device the latter and its components have not been represented true to scale in part and/or have been enlarged and/or reduced in size.

The problem addressed by the independent solutions according to the invention can be taken from the description.

Mainly the individual embodiments shown in FIGS. 1, 2; 3; 4; 5; 6 can form the subject matter of independent solutions according to the invention. The objectives and solutions according to the invention relating thereto can be taken from the detailed descriptions of these figures.

LIST OF REFERENCE NUMERALS

1 Conveying device
2 Packaged item
3 Roller conveyor
4 Conveying means
5 Conveying roller
6 Support frame
7 Support leg
8 Support profiles
9 Transport plane
10 Guiding profile
11 Conveying width
12 Roller length
13 Conveying section
14 Drive line
15 Drive device
16 Drive motor
17 Flat belt disc
18 Belt slots
19 Tensioning device
20 Drive belt
21 Flat belt
22 Roller apparatus
23 Arrow
24 Coupling and/or brake roller
25 Control and regulating device
26 Coupling
27 Drive coupling
28 Brake coupling
29 Support
30 Axle
31 End section
32 Ball or roller bearing
33 Ball or roller bearing
34 Bearing arrangement
35 Drive means
36 Extension
37 Roller element
38 Tube
39 External diameter 40 Overlapping section
41 Tube
42 End section
43 Bearing arrangement
44 Deep-groove ball bearing
45 Cover disc
46 Insertion wedge
47 Bearing support ring
48 Deep-groove ball bearing
49 Bearing arrangement
50 Coupling element
51 Coupling element
52 Surface
53 Surface
54 Gap chamber
55
56 Transmission means
57 External diameter
58 Internal diameter
59 Sealing ring
60 Support sleeve
61 Regulating element
62 Electric coil
63 Line
64 Brake element
65 Longitudinal middle axis
66 Circumferential surface
67 Gap chamber
68 Internal diameter
69 External diameter
70 Depression
71 External circumference
72 Electric coil
73 Regulating element
74 Line
75 Sealing ring
76 Cord belt
77
78
79
80 Band or belt conveyor
81 Lower frame
82 Guiding rollers
83 Belt
84 Longitudinal profiles
85 stub shaft
86 Distance
87 Support roller
88 Drive motor
89 Drive roller
90 Sprocket wheel
91 Sprocket wheel
92 Chain strand
93 Tensioning wheel
94 Linear guide
95 Lower side
96 contact surface
97 Double arrow
98 Spring arrangement
99
100 Drive and/or brake unit
101 Drive disc
102 Hub
103 Line
104 Line
105 Rotary transmitter
106 End section
107 Sensor

The invention claimed is:

1. Conveying device (1) for packaged items (2) with at least one conveying means (4), for the packaged items (2) to be transported by the at least one conveying means, comprising a drive device (15) and at least one operable coupling (26) between a drive means (35) of the drive device (15) and the conveying means (4), wherein the coupling (26) comprises a gap chamber (54, 67) designed for receiving a transmission means (56) between a first and a second coupling element (50, 51) and adjacent to the gap chamber (54) a regulating element (61, 73) a power coupling between the coupling elements (50, 51) and operated by a control or regulating device (25) is arranged, wherein the drive means (35) is mounted rotatably on a fixed axle (30) or stub shafts (85) held in a non-rotatable manner in support profiles (8) and the regulating element (61, 73) is formed by an electric coil (62, 72) connected in a non-rotatable manner to the axle (30) or stub shafts (85), which electric coil is connected by lines (63) to a control or regulating device (25).

2. Conveying device (1) according to claim 1, wherein the conveying device (1) comprises a further coupling (26), which comprises a gap chamber (54, 67) designed for holding a transmission means (56) between a first and a second coupling element (50, 51) and adjacent to the gap chamber (54) a regulating element (61, 73) forming a power coupling between the coupling elements (50, 51) and driven by a control or regulating device (25) is arranged.

3. Conveying device (1) according to claim 2, wherein one of the couplings (26) is designed as a drive coupling (27) and the other is designed as a brake coupling (28).

4. Conveying device (1) according to claim 1, wherein a coupling element (50, 51) is formed by a drive means (35) which is drive-connected to the drive device (15) and an additional coupling element (50, 51) is formed by a roller element (37) of the conveying means (4).

5. Conveying device (1) according to claim 1, wherein the additional coupling element (50, 51) is formed by a brake element (64).

6. Conveying device (1) according to claim 1, wherein the transmission means (56) in the gap chamber (54, 67) is formed by an electrorheological fluid which can change in at least one physical parameter during the power charging of the regulating element (61) by the control and regulating device (25).

7. Conveying device (1) according to claim 1, wherein the transmission means (56) in the gap chamber (54, 67) is formed by a magnetorheological fluid which can change in at least one physical parameter during the power charging of the regulating element (61) by the control and regulating device (25).

8. Conveying device (1) according to claim 1, wherein the transmission means (56) in the gap chamber (54, 67) is formed by an electrorheological or magnetorheological paste-like, powdery or granulate-like medium which can change in at least one mechanical parameter during the power charging of the regulating element (61) by the control and regulating device (25).

9. Conveying device (1) according to claim 1, wherein the control or regulating device (25) is designed for setting up a magnetic field.

10. Conveying device (1) according to claim 1, wherein the control or regulating device (25) is designed for setting up an electrical voltage field.

11. Conveying device (1) according to claim 1, wherein the control or regulating device (25) is designed for setting up an electrical force field.

12. Conveying device (1) according to claim 1, wherein at least one physical parameter of the transmission means (56) can be controlled or regulated by the voltage field, force field, or magnetic field of the transmission means (56).

13. Conveying device (1) according to claim 1, wherein the conveying means (4) comprises a conveying roller (5), provided with the coupling(s) (26), whereby the conveying roller (5) comprises a non-rotatable axle (30) or stub shafts (85) held in support profiles (8) of the conveying device (1), and on the non-rotatable axle or the stub shafts the drive means (35) or the first coupling element (50, 51) and a roller element (37) forming the additional coupling element (50, 51) are mounted rotatably relative to one another.

14. Conveying device (1) according to claim 1, wherein the conveying means (4) provided with the coupling (26) is formed by a guiding roller (82), which comprises a non-rotatable axle (30) or a stub shaft (85), in support profiles (8) of the conveying device (1), and on the non-rotatable axle or the stub shaft the drive means (35) or the first coupling element (50, 51) and a roller element (37) forming the further coupling element (50, 51) are mounted rotatably relative to one another.

15. Conveying device (1) according to claim 13, wherein the drive means (35) is formed by a roller, pulley, or sprocket (91) and the coupling element (50, 51) connected to the drive means in a non-rotatable manner is designed as a tube extension (36), which projects into the roller element (37).

16. Conveying device (1) according to claim 4, wherein the gap chamber (54, 67) is formed between an outer surface (52) of the coupling element (50, 51) and an inner surface (53) of the roller element (37).

17. Conveying device (1) according to claim 16, wherein the gap chamber (54, 67) is delimited for example on both sides by sealing rings (59).

18. Conveying device (1) according to claim 1, wherein the regulating element 61, 73) is connected via lines (63) in the axle (30) or one of the stub shafts (85) to the control or regulating element (25), for example.

19. Conveying device (1) according to claim 1, wherein the conveying means (4) is drive-connected to at least one conveying roller (5) of a roller conveyor via a drive belt, a chain, or a cable.

20. Conveying device (1) according to claim 1, wherein the conveying means (4) is formed by a band or belt conveyor (80), which is drive-connected to the drive means (35) comprising the drive coupling (27) and/or the brake coupling (28).

21. Conveying device (1) according to claim 1, wherein the conveying means (4) is formed by a chain conveyor, which is drive-connected to the drive means (35) comprising the drive coupling (27) and/or the brake coupling (28).

22. Conveying device (1) according to claim 1, wherein a drive and/or brake unit (100), which is drive-connected to the drive device (15) and comprises the drive coupling (27) and/or the brake coupling (28), is arranged in front of a conveying means (4) of a conveying section (13) of the conveying device (1).

23. Conveying device (1) according to claim 22, wherein the drive coupling (27) or the brake coupling (28) is an electromechanical coupling.

24. Conveying device (1) according to claim 22, wherein the drive and/or brake unit (100) comprises the drive means (35) and a drive disc (101) rotatable relative to the drive means (35) and which are mounted rotatably on stub shaft (85) secured onto the support frame (6).

25. Conveying device (1) according claim 24, wherein the drive means (35) surrounds partly coaxially the drive disc (101).

26. Conveying device (1) according to claim 24, wherein the drive means (35) is mounted rotatably on a hub (102) of the drive disc (101).

27. Conveying device (1) according to claim 24, wherein the drive coupling (27) is formed between the drive means (35) and the drive disc (101).

28. Conveying device (1) according to claim 24, wherein the brake coupling (28) is formed between the drive disc (101) and the stub shaft (85).

29. Conveying means for a conveying device (1), with a drive means (35) drive-connected to a drive device (15) and a roller element (37) mounted rotatably relative thereto and with at least one coupling arranged between the drive means (35) and the roller element (37), wherein the coupling (26) is designed as a drive coupling (27) and/or brake coupling (28) according to claim 1 and is arranged inside the conveying means (4).

30. Conveying means (4) according to claim 29, wherein at least the drive coupling (27) is designed as an electro-mechanical coupling and is arranged inside the conveying means (4).

31. Conveying means (4) according to claim 30, wherein at least the brake coupling (28) is designed as an electromechanical coupling and arranged inside the conveying means (4).

* * * * *

UNITED STATES PATENT AND TRADEMARK OFFICE
CERTIFICATE OF CORRECTION

| | | |
|---|---|---|
| PATENT NO. | : 8,186,501 B2 | Page 1 of 1 |
| APPLICATION NO. | : 12/734221 | |
| DATED | : May 29, 2012 | |
| INVENTOR(S) | : Wolkerstorfer | |

It is certified that error appears in the above-identified patent and that said Letters Patent is hereby corrected as shown below:

In the Claims:

In Column 12, line 13 (Claim 1) after "(61, 73)" please insert: --producing--.

Signed and Sealed this
Third Day of September, 2013

Teresa Stanek Rea
*Acting Director of the United States Patent and Trademark Office*